US010237179B2

(12) United States Patent
Natarajan et al.

(10) Patent No.: US 10,237,179 B2
(45) Date of Patent: Mar. 19, 2019

(54) SYSTEMS AND METHODS OF INTER DATA CENTER OUT-BOUND TRAFFIC MANAGEMENT

(71) Applicant: Dell Products L.P., Round Rock, TX (US)

(72) Inventors: Avinash Natarajan, Tamil Nadu (IN); Shivakumar Sundaram, Tamil Nadu (IN); Balaji Venkat Venkataswami, Tamil Nadu (IN)

(73) Assignee: DELL PRODUCTS L.P., Round Rock, TX (US)

( * ) Notice: Subject to any disclaimer, the term of this patent is extended or adjusted under 35 U.S.C. 154(b) by 127 days.

(21) Appl. No.: 15/144,003

(22) Filed: May 2, 2016

(65) Prior Publication Data

US 2016/0248669 A1 Aug. 25, 2016

Related U.S. Application Data

(63) Continuation of application No. 14/049,142, filed on Oct. 8, 2013, now Pat. No. 9,374,310.

(51) Int. Cl.
*G06F 9/455* (2018.01)
*H04L 12/46* (2006.01)
*H04L 12/66* (2006.01)
*H04L 12/709* (2013.01)
*H04L 12/741* (2013.01)
(Continued)

(52) U.S. Cl.
CPC .............. *H04L 45/74* (2013.01); *G06F 9/455* (2013.01); *G06F 9/45558* (2013.01); *H04L 12/4641* (2013.01); *H04L 12/4675* (2013.01); *H04L 12/66* (2013.01); *H04L 45/245* (2013.01); *H04L 45/745* (2013.01); *H04L 47/125* (2013.01); *G06F 2009/4557* (2013.01); *G06F 2009/45595* (2013.01); *H04L 61/2038* (2013.01); *H04L 61/6013* (2013.01); *Y02D 30/30* (2018.01)

(58) Field of Classification Search
None
See application file for complete search history.

(56) References Cited

U.S. PATENT DOCUMENTS

| | | | |
|---|---|---|---|
| 9,100,213 B1* | 8/2015 | Ramanathan | H04L 45/66 |
| 2005/0074015 A1* | 4/2005 | Chari | H04L 12/2856 |
| | | | 370/400 |
| 2012/0008528 A1 | 1/2012 | Dunbar | |

(Continued)

*Primary Examiner* — Yaotang Wang
(74) *Attorney, Agent, or Firm* — Haynes and Boone, LLP.

(57) ABSTRACT

An information handling system is provided. The information handling system includes a first network device that forms at least part of a first set of network devices. The first network device provides an interface between a local first server rack and a cloud and has one or more processors in communication with a memory. The first network device is configured to receive information from a second set of network devices that identifies a default gateway for a virtual machine running on a remote server rack. The first network device is also configured to create a local destination address entry associated with information, to store the entry in an address table in the memory, and to receive a packet having the information identifying the default gateway as a destination address. The first network device is further configured to forward the packet into the cloud on in proxy for the default gateway.

16 Claims, 5 Drawing Sheets

(51) Int. Cl.
*H04L 12/803* (2013.01)
*H04L 29/12* (2006.01)

(56) References Cited

U.S. PATENT DOCUMENTS

| 2014/0012966 A1* | 1/2014 | Baphna | H04L 49/70 709/221 |
| 2014/0233569 A1* | 8/2014 | Yong | H04L 45/64 370/392 |
| 2014/0293779 A1 | 10/2014 | Kako et al. | |
| 2014/0376550 A1 | 12/2014 | Khan et al. | |

* cited by examiner

SYSTEMS AND METHODS OF INTER DATA CENTER OUT-BOUND TRAFFIC MANAGEMENT

CROSS-REFERENCE

The present application is a continuation of U.S. patent application Ser. No. 14/049,142 filed on Oct. 8, 2013, which is incorporated by reference in its entirety.

BACKGROUND

1. Technical Field

The present disclosure is related to information handling systems. In particular, embodiments disclosed herein are related to implementation and management of systems comprising multiple data centers.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some currently available information handling system implementations include a larger number of virtual machines spanning more than one data center. Each data center includes switches, routers, and servers with virtual machines running thereon. The virtual machines may be configured to have a default gateway through which packets may be sent into a larger layer 3 network coupled to the data center, such as the Internet. In certain circumstances, a virtual machine instance may be moved from one server on a rack in one data center to a server in another data center. For example, processing may be better distributed in the data center by moving some virtual machine instances from over-utilized servers to under-utilized servers. The virtual machine instance is moved along with the information identifying the default gateway. Packets from the virtual machine may be sent from one data center to the other before being forwarded into the layer 3 network. This "inter data center" traffic, traffic between two or more data centers, may decrease the performance of the overall information handling system. Thus, current data center implementations have not been entirely satisfactory.

SUMMARY

Consistent with some embodiments, a method of decreasing inefficient traffic flows in an information handling system is disclosed herein. The method includes a step of receiving identifying information at a first network device from a second network device. The identifying information identifies a default gateway of a virtual machine on a remote server. The first network device is part of a first set of network devices and the second network device is part of a second set of network devices. The method also includes a step of installing a local destination address entry that includes the identifying information in a forwarding information base of the first network device for a relocated instance of the virtual machine running on a local server beneath and coupled to the first network device. The method further includes steps of receiving a data packet from the relocated instance of the virtual machine and forwarding the data packet into a layer 3 network from the first network device on behalf of the default gateway. The data packet includes the identifying information identifying the default gateway.

Consistent with some embodiments, there is provided an information handling system. The information handling system includes a first network device that forms at least part of a first set of network devices. The first network device provides a layer 3 interface between a local first server rack and a layer 3 cloud and has one or more processors in communication with a memory. The first network device is configured to receive media access control (MAC) address and virtual local area network (VLAN) information from a second set of network devices, the MAC address and VLAN information identifying a default gateway for a virtual machine running on a remote second server rack. The first network device is also configured to create a local destination address associated with the MAC address and VLAN information, to store the local destination address in a forwarding information base in the memory, and to receive a packet having the information identifying the default gateway as a destination address. The first network device is further configured to forward the packet into the layer 3 cloud on as a proxy for the default gateway.

Consistent with some embodiments, there is further provided a computer-readable medium that includes instructions that when executed by one or more processors of an information handling system cause the information handling system to perform a method for decreasing inefficient traffic flows in the information handling system. The method includes steps of assigning a default gateway to a virtual machine running on a first server rack. The default gateway is provided by a first set of one or more network devices located vertically above the first server rack in a topology of the information handling system. The method further includes steps of moving the virtual machine from the first server rack to a second server rack, configuring a second set of one or more network devices to serve as a proxy for the default gateway assigned to the virtual machine, and forwarding a packet received from the virtual machine from the second set directly to a layer 3 cloud.

These and other embodiments will be described in further detail below with respect to the following figures.

Figure 1:
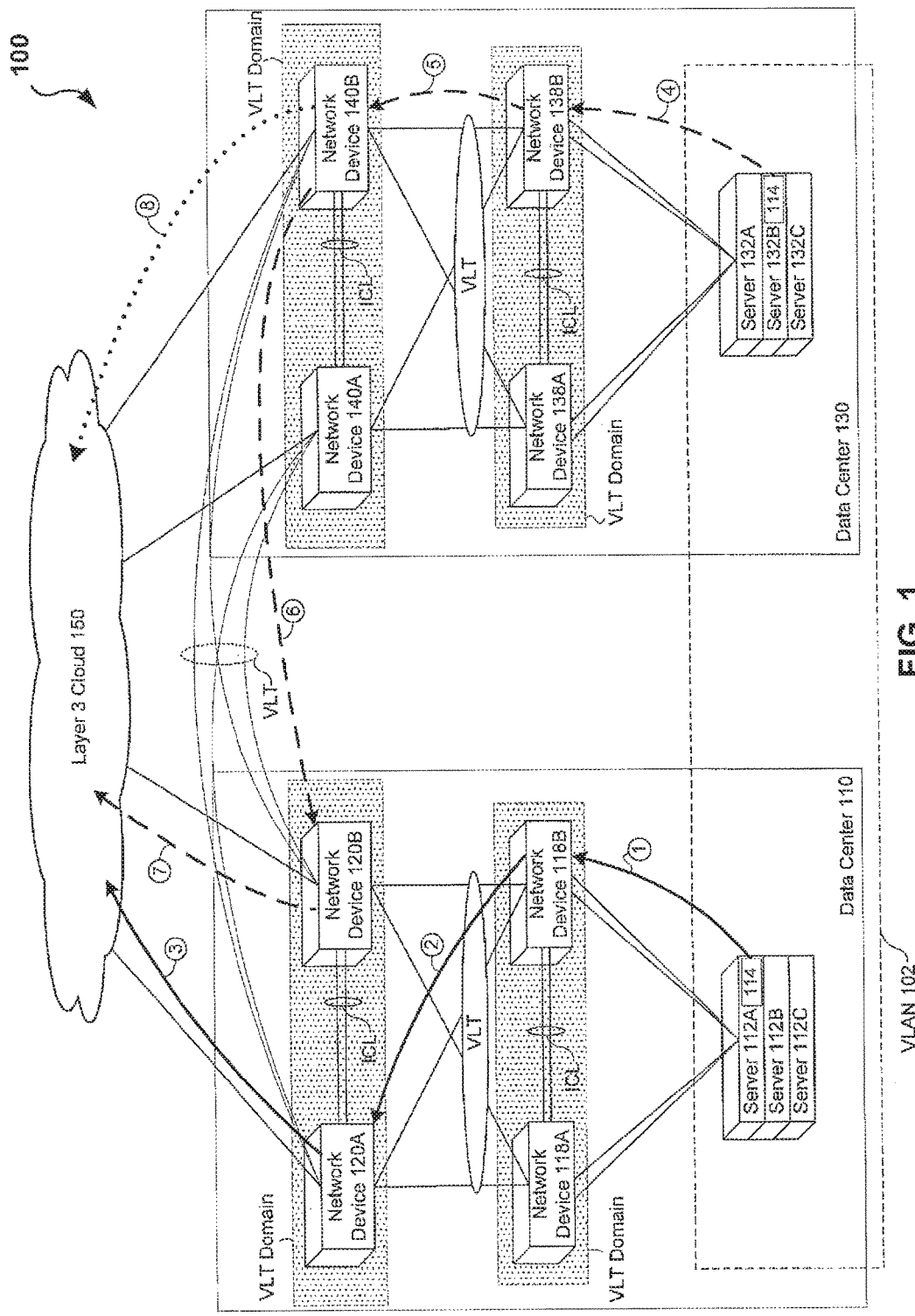
FIG. 1 is a diagram of an information handling system in which a virtual machine is moved from one data center to another.

For clarity of discussion, elements having the same designation in the drawings may have the same or similar functions. The drawings may be better understood by referring to the following Detailed Description.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Additionally, some embodiments of information handling systems include non-transient, machine-readable media that include executable code that when run by a processor, may cause the processor to perform the steps of methods described herein. Some common forms of machine-readable media include, for example, floppy disk, flexible disk, hard disk, magnetic tape, any other magnetic medium, CD-ROM, any other optical medium, any other physical medium with patterns of holes or depressions, RAM, PROM, EPROM, FLASH-EPROM, any other memory chip or cartridge, and/or any other medium from which a processor or computer is adapted to read.

FIG. 1 depicts an information handling system 100 that includes a first data center 110 and a second data center 130 spanned by a VLAN 102. In some embodiments, the data centers 110 and 130 may be separately housed in buildings located 3 kilometers, 10 kilometers, or more apart. In other embodiments, the data centers 110 and 130 may be housed in a single facility. Each of the data centers 110 and 130 is coupled to a common layer 3 network, such as a cloud or the Internet. The data centers 110 includes a plurality of servers, hosts, network devices, such as routers and switches, coupled using various protocols, some of which are described in detail herein.

As illustrated, the first data center 110 includes a plurality of servers, including servers 112A, 112B, and 112C. Each of the servers 112A-C includes one or more processors and memory. The servers 112A-C may provide computing, networking, and storage resources for a plurality of virtual machines (VMs) running thereon. A virtual machine 114 is illustrated as running on server 112A. Virtual machine 114, or VM 114, may be moved to another server within the data center, and as will be described in greater detail below, VM 114 may also be moved out of data center 110 and into another data center, such as data center 130.

The servers 112A-C may be configured in a single server rack or in a plurality of server racks. A single server rack 116 is depicted in FIG. 1. The rack 116 may have a top-of-rack device to facilitate communication with one or more network devices. As illustrated, the server rack 116 is coupled by a plurality of links, providing redundancy, to a network device 118A, and by another plurality of links to a network device 118B. These pluralities of links may be configured in a link aggregation group or groups, providing redundancy and load balancing. Hash functions may be used in determining whether a packet from a VM running on one of the servers 112A-C is sent to network device 118A or to network device 118B.

In FIG. 1, the network devices 118A and 118B are coupled by interconnect links (ICL) and configured to provide a single domain, such as a virtual link trunking (VLT) domain. The network devices 118A and 118B are configured as peers to be able to act effectively as a single network device. Network devices 118A and 118B provide at least layer 2 devices and may provide an access layer for the data center 110. In some embodiments, network devices 118A and 118B may be layer 2/layer 3 devices. Additionally, some embodiments of the information handling system 100 may include more network devices configured in an access layer.

The information handling system 100 further includes a plurality of aggregation layer devices. Thus, the data center 100 includes network devices 120A and 120B. The network devices 120A and 120B are configured to communicate at layer 2 and layer 3. As illustrated, the network devices 120A and 120B are coupled to the network devices 118A and 118B on one side and to a layer 3 cloud 150 on the other side. The layer 2 links between the network devices 120A and 120B and the network devices 118A and 118B may be 40 gigabit Ethernet links in some embodiments. These links are configured in a link aggregation group so that frames from network device 118A or 118B may be hashed optimally either to the network device 120A or to network device 120B. The network devices 120A and 120B are coupled to the cloud 150 with a routing protocol such as the open shortest path first (OSPF) protocol, the intermediate-system to intermediate-system (ISIS) protocol, or another suitable protocol.

The network devices 120A and 120B are coupled together by interconnect links and configured in a routed virtual link trunking (VLT) implementation so that the network devices 120A and 120B may act as a single domain, both in layer 2 and in layer 3. A virtual router redundancy protocol may operate between the network devices 120A and 120B. The network devices 118A and 118B are coupled to the network devices 120A and 120B in a VLT implementation. The VLT implementation is a link aggregation group that connects two VLT domains.

The second data center 130 includes a number of features that are similar to those described above with respect to the first data center 110. Thus, the data center 1130 includes a plurality of servers, including servers 132A, 132B, and 132C in a server rack 136 such that they are coupled to an access layer. The access layer includes at least a network device 138A and a network device 138B, which are coupled by a plurality of links to aggregation devices, such as network device 140A and 140B. The network devices 140A and 140B are coupled to the cloud 150. These network devices 140A and 140B are coupled to the network devices 120A and 120B of the first data center 110 by layer 2 links 160. The link 160 may be configured in a link aggregation group. For example, in some embodiments the links 160 are configured in a square virtual link trunking implementation. Information may be shared between the network devices 120A and 120B and the network devices 140A and 140B. Link layer protocols are used the network devices 120A, 120B, 140A, and 140B in their exchange of information.

The network devices 120A, 120B, 140A, and 140B, and other network devices in some embodiments, exchange media access control (MAC) addresses and virtual local area network (VLAN) information. In this manner, network devices 120A and 120B are made aware of the MAC address and VLAN information associated with network devices 140A and 140B, and vice versa. For example, in the illustrated embodiment a link layer discovery protocol (LLDP) provides for the exchange of LLDP data units. The LLDP units each contain one or more type-length-value (TLV) structures or elements. While some information is exchanged by the inclusion of standard TLV elements, or simply TLVs, a custom TLV may be used to carry additional information of messages. Such a custom TLV may include 127 as its type. For example, a message from network device 120A may be included in a TLV, transmitted to network device 140B over links 160, that directs the network device 140B to include the MAC address and VLAN information in a local forwarding information base with a local destination address entry. After the local destination address entry is installed, the network device 140B may act as a proxy router on behalf of the network device 120A. Because the network devices 140A and 140B are configured together in a domain, a corresponding entry may be installed in the network device 140A so that it also may be configured to act as a proxy router.

FIG. 1 illustrates an exemplary path of a packet that has a destination address available in the cloud 150 as it is sent from the VM 114. The VM 114 is configured with a default gateway through which packets can access the cloud 150. In this example the default gateway is the network device 120A. The packet sent by VM 114 is hashed toward the network device 118B as indicated by the path illustrated by arrow 1. From the network device 118B the packet is transmitted to the network device 120A, shown by the arrow 2, and from there into the cloud 150 along the arrow 3. The exemplary path, illustrated by path arrows 1, 2, and 3, may direct the packet into the cloud 150 with a minimum possible number of hops, and may be an optimized path given the traffic within the data center 110. Because of the configuration of the network devices 120A and 120B, either network device 120A or 120B may server as the default gateway for the VM 114.

However, an event may occur that requires the VM 114 to move the server 112A to server 132B in data center 130. In a typical configuration, packets sent from the VM 114 to the same destination available through cloud 150 travel a different path, illustrated in dashed lines arrows. An exemplary packet is hashed to the network device 138B and then to the network device 140B along arrows 4 and 3, respectively. In a typical configuration, the network device 140B transmits the packet toward the default gateway of the VM 114, which is moved such that the default gateway (network device 120A) remains its default gateway. Thus, the network device 140B forwards the packet toward the default gateway, network device 120A, over the links 160, along arrow 4. The packet arrives at the network device 120B, which the routes the packet into the cloud 150, along arrow 5. This phenomenon in which a horizontal transmission occurs may be referred to as tromboning or hair-pinning. The systems and methods described herein may decrease or eliminate traffic tromboning in certain circumstances.

As discussed above, the network devices 120A, 120B, 140A, and 140B in information handling system 100 are configured to exchange MAC address and VLAN information through LLDP units. TLVs may include an "add" message to direct network devices 140A and/or 140B to include a local destination address entry with the MAC address and VLAN information. The additional message may be triggered by a user configuration. Thus, rather than directing the exemplary packet from the network device 140B to the network device 120B (along arrow 4), the network device 140B acts as a proxy for the default gateway and routes the packet directly into the cloud 150, along the dotted line arrow 8. This behavior decreases or eliminates tromboning to conserve bandwidth along the links 160 and also decrease the hop-count of applicable packets, providing faster response times.

In the event that the VM 114 is moved back to the data center 114, to any of the servers 112A-C, a corresponding withdrawal message may be transmitted from either network device 120A or 120B to network devices 140A and 140B directing the deletion of the local destination address entry. The transmission of the withdrawal message may be triggered by a user configuration. The message, which may be sent in a TLV, may cause the network devices 140A and 140B to cease operating as a proxy for the default gateway of VM 114.

In some embodiments of information handling system 100, only a single data center is present, the data center includes the racks 116 and 136, and the network devices 118A, 118B, 138A, 138B, 120A, 120B, 140A, and 140B, and others in the aggregation and/or access layers. Such embodiments may conserve bandwidth and improve performance within the data center as described above. Additionally, the addition and withdrawal messages may be communicated as extensions to a number of standard protocols or to a proprietary, vendor-specific protocol and be triggered by user configurations. Some embodiments of the information handling system 100 do not include virtual link trunking implementations, but the exchange of MAC address and VLAN information among the aggregation layer network devices may still permit proxy routing as described.

Figure 2:
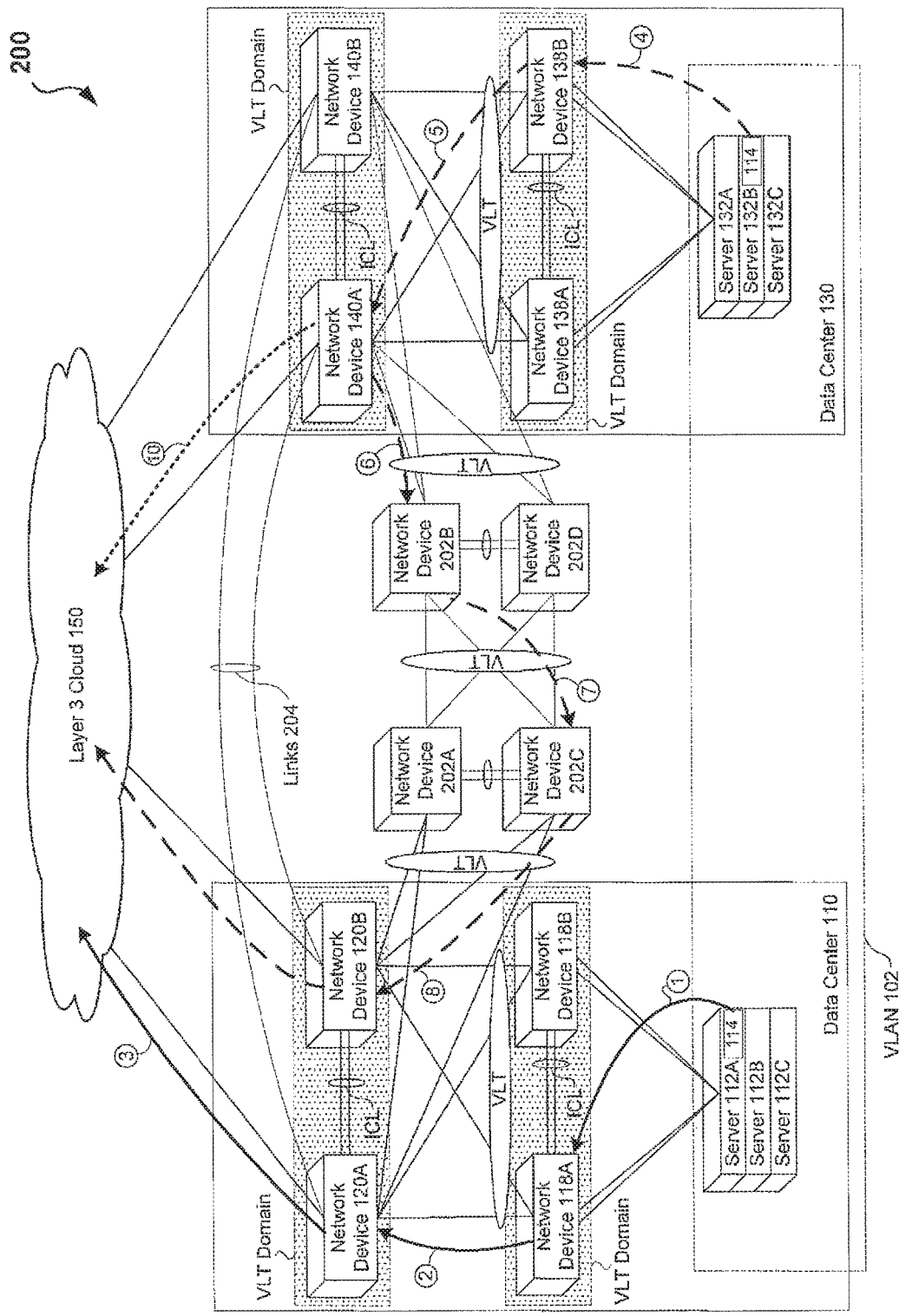
FIG. 2 is a diagram of an alternative information handling system in which a virtual machine is moved from one data center to another.

FIG. 2 illustrated an information handling system 200 that shares many of the features described above in connection with the information handling system 100 of FIG. 1, where the features of information handling system 200 are equivalent or similar to those of information handling system 100, the same reference numbers are maintained. Thus, information handling system 200 includes two data centers 110 and 130 spanned by a VLAN 102. The first data center 110 includes exemplary servers 112A-C, in a rack 115 which are coupled to an access layer. The access layer includes at least two network devices, illustrated as network devices 118A and 118B. The access layer network devices 118A and 118B are coupled by a link aggregation group to aggregation layer network devices 120A and 120B. These network devices 120A and 120B are, in turn, coupled to the layer 3 network, cloud 150. In the second data center 130, a plurality of servers 132A-C are coupled to network devices 138A and 138B, which are in turn coupled to network devices 140A and 140B. These network devices and the links coupling them are substantially similar to those described as featured in information handling system 200.

Information handling system 200 further includes a plurality of intermediate network devices coupled between the network devices 120A and 120B on one side and the network devices 140A and 140B on the other. As illustrated in FIG. 2, four network devices are present: network devices 202A, 202B, 202C, and 202D. Other embodiments may include more or fewer network devices; some embodiments may not have any intermediate network devices. The network devices 202A-D are layer 2 network devices. Network devices 202A and 202C are coupled by interconnect links (ICL), as are network devices 202B and 202D. Link aggregation groups (LAGs) are present between the network devices 202A and 202C and the network devices 120A and 120B, between the network devices 202B and 202D and 140A and 140B, and between the network devices 202A and 202C and network devices 202B and 202D. The LAGs may facilitate load-balancing.

As depicted, the network devices 120A, 120B, 140A, and 140B communicate with additional layer 3 devices in the cloud 150 according to a routing protocol such as OSPF or ISIS. Additionally, the network device 120A and 120B are coupled to the network devices 140A and 140B by layer 3 links 204. The links 204 may permit the network devices 120A and 120B to communicate with the network devices 140A and 140B according to a routing protocol. In some embodiments, the routing protocol is OSPF. These links 204 may be five kilometers, ten kilometers, or longer in length. Thus, links 204 permit the data centers 110 and 130 to be separated by corresponding differences. For example, the data centers 110 and 130 may in a single building, a single campus, or may be in distinct locations.

As described above in connection with information handling system 100 of FIG. 1, an exchange of MAC address and VLAN information permits proxy routing on behalf of default gateways. A path of a packet sent by a VM 114 on server 112A into the cloud 150 through a default gateway provided by network device 120B is indicated in solid-line arrows 1, 2, and 3. After the VM 114 is moved to server 132A, dashed-line arrows 4, 5, 6, 7, 8, and 9 indicate the path an exemplary packet may travel in a typical information handling system in which the network devices 140A and 140B are not configured to act as a proxy for the default gateway. A dotted line arrow 10 indicates the flow of the packet when the network devices 140A and 140B are configured to proxy route for the default gateway in data center 110.

The information handling system 200 may provide for such proxying in different ways. For example, in some embodiments of information handling system 200, the MAC address and VLAN information of a given aggregation layer network device in data center 110 is shared over the layer 3 link to a corresponding network device in data center 130. The links 204 couple network device 120A directly to the network device 140A and the network device 120B to the network device 140B. These links may provide layer 3 communication according routing protocols such as ISIS and OSPF. In embodiments in which ISIS implementations are used, MAC address and VLAN information and addition or withdrawal messages may be carried in an ISIS generic information TLV, a TLV having a type of 251. The addition or withdrawal message may be processed only when there is an adjacency within the VLAN between the sending and receiving network devices. Such adjacency is present in information handling system 200 as illustrated.

Alternatively, in embodiments in which OSPF is used as the routing protocol, opaque link-state advertisements (LSAs) may be used to carry the information and the addition/withdrawal messages. These LSAs may be flooded in the information handling system 200. However, the messages may be processed only when there is an adjacency between the routers or network devices. This may be accomplished by including information in the LSAs or generic information TLVs that indicates to a receiving network device whether or not it should process the packet.

In some embodiments of information handling system 200, rather than communicating the MAC address and VLAN information and the addition/withdrawal message over layer 3 communication, such exchanges are performed by layer 2 communication through the intermediate network devices 202A-D. This may occur largely as discussed above in connection with information handling system 100 of FIG. 1.

In some embodiments, network devices in the access layer (network devices 118A, 118B, 138A, and 138B) are combination layer 2/layer 3 devices. In some such embodiments, the network devices 118A, 118B, 138A, and 138B may be configured as a default gateway for one or more VMs running on the coupled server racks in addition to the aggregation layer network devices 120A, 120B, 140A, and 140B. For example, VMs on the first server rack 116 may be configured so that some have default gateways provided by network devices 118A and 118B, while others have default gateways provided by network devices 120A and 120B. The same tromboning issue may occur in the event of a VM move from data center 110 to data center 130. As discussed above, MAC address and VLAN information identifying the default gateway of a particular VM that has moved may be provided to a network device or network devices on the access layer of the second data center 130. The data for the local destination address entry use to permit proxy routing may be exchanged as described above. Thus, the network devices 118A and 118B may be configured to proxy for the network devices 138A and 138B. This may provide a hierarchical proxy gateway system, in which the access layer network devices proxy for each other and the aggregation layer network devices proxy for each other in the event of a VM movement.

To achieve the hierarchical proxy gateway system the router identifier of the device to act as proxy is included in the TLVs along with the MAC address and VLAN information as discussed earlier. When a router, such as may be provided by network devices 120A, 120B, 140A, and/or 140B, receives such a TLV directing an addition or withdrawal, the router may process the full contents of the TLV if the TLV contains the router identifier of that router. The router identifier may be the configured Interior Gateway Protocol router identifier of the device. The TLVs may be transmitted as link-state packets (LSPs) or link-state advertisements (LSAs) in ISIS of OSPF networks, respectively.

In general, in information handling systems 100 and 200 when a packet or frame is received at one set of aggregation layer devices with the MAC address and VLAN information of a default gateway on the other set of aggregation layer devices, the packet is proxy routed when it is a data packet. To prevent non-routing frames, like an address response protocol (ARP) reply, for being handled incorrectly, the receiving network device may be configured with access control list (ACL) entries that can redirect frames out of the interface on which a MAC address and VLAN information addition message was received.

Under certain circumstances, the routing tables on the network devices in the data center 110 may not contain all of the entries contain in the routing tables of the network devices in the data center 130. Under such circumstances where a route look-up fails, if a frame's destination address and VLAN information matches the other data center's, ACL entries may be applied to redirect a frame out on the interface on which corresponding addition/withdrawal messages were received. The information handling system 200 may provide for non-routable and route-failure frames to be transported to the intended recipient instead of performing proxy processing.

Figure 3:
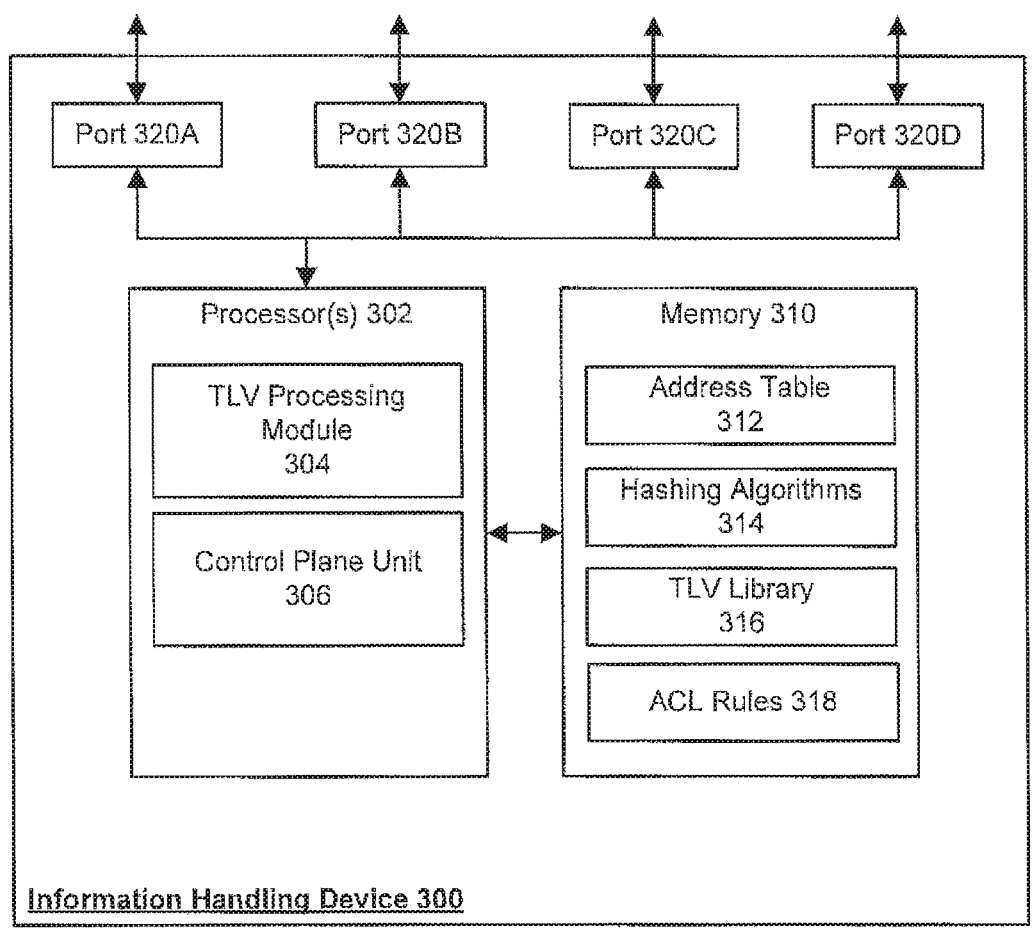
FIG. 3 is a function diagram of an information handling device.

FIG. 3 is a functional diagram of an information handling device 300 that may be useful in understanding the operations and features of the network devices of information handling systems 100 and 200. Embodiments of the information handling device 300 may include a server, a switch, a router, or combinations thereof.

As illustrated in FIG. 3, the device 300 includes a processor 302 in communication with a memory 310 and a plurality of interfaces or ports 320A-D. While depicted as a single processor in FIG. 3, the processor 302 may be a plurality of network processors functioning together to provide various capabilities and features. In the depicted embodiment, the processor 302 provides a type-length-value (TLV) processing module 304 and a control plane unit 306. Relating to information handling system 100, when an LLDP data unit is received on one of ports 320A-D, the frame is processed by processor 302's TLV processing module 304. As described, LLDP data units may be used to send addition and withdrawal messages between the network devices 120A and 120B and the network devices 140A and 140B so that proper local destination address entries are installed to enable proxy routing. Thus, any TLVs and any information included in the LLDP data units may be extracted by the TLV processing module 304. In addition to the TLV processing module 304, device 300 includes a TLV library 316 that has a plurality of TLVs that can be included in LLDP data units sent by device 300 to any devices connected to ports 320A-D. These TLVs include the addition and withdrawal messages used to direct the addition or withdrawal of local destination address entries.

When sending a data packet or frame received on device 300 from a VM, processor 302 performs a look-up in an address table 312 stored in memory 310. The address table 312 may be a forwarding table or a routing table. MAC address and VLAN information in a frame may be used to determine on which port a frame should be hashed. The processor 302 may select from a plurality of hashing algorithms 314 stored in memory 310 to hash the frame to one of ports 320A-D. The memory 310 also includes a plurality of ACL rules 318, including the ACL rules described above in connection with the information handling system 200. These ACL rules 318 may be enforced by the processor 302 in connection with the control plane unit 306.

Figure 4:
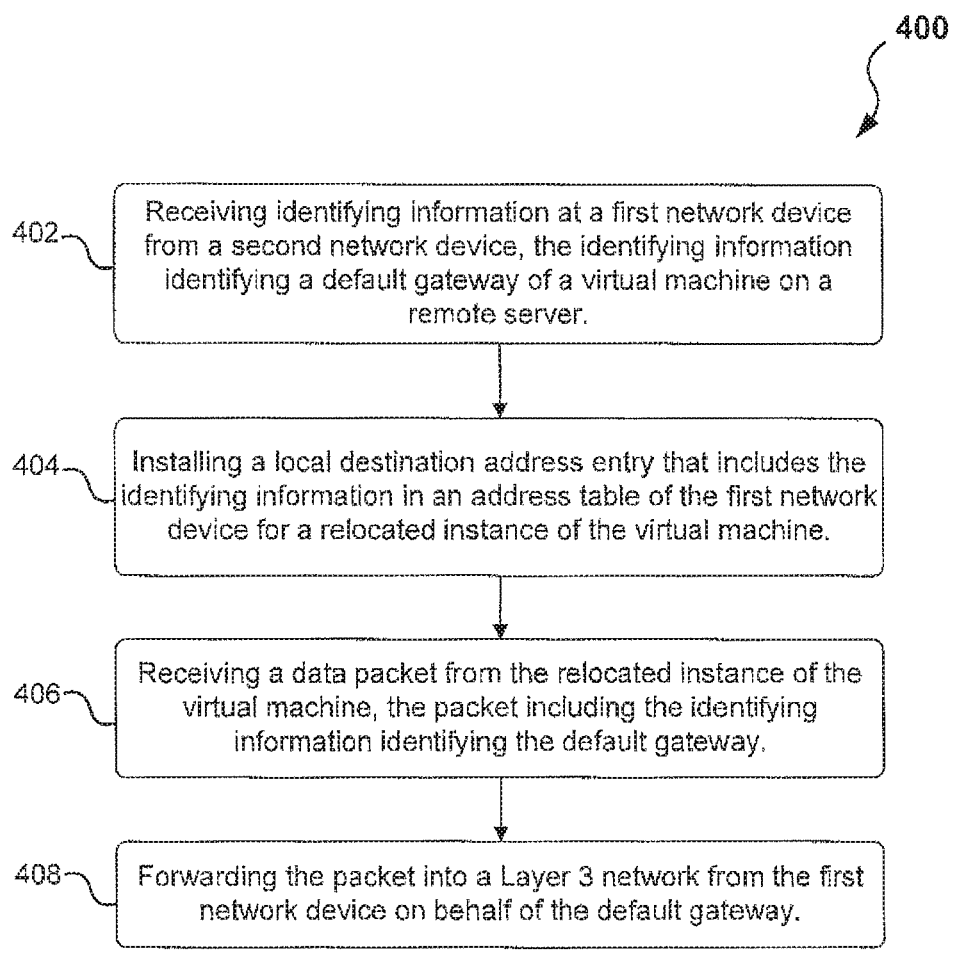
FIG. 4 is a flowchart of a method of decreasing inefficient traffic flows in an information handling system.

FIG. 4 is a flowchart of a method 400 for decreasing inefficient traffic flows in an information handling system. As illustrated, the method 400 includes a plurality of enumerated steps. Embodiments of the method 400 may include additional steps before, after, and/or in between the enumerated steps. Additionally, the enumerate steps may be performed in a sequence other than that depicted in FIG. 4. The method 400 may begin in step 402 in which a first network devices receives information, from a second network device, identifying a default gateway of a VM on a remote server. The VM may be relocated to a local server at or around the time when the first network devices receives the information. In step 404, the first network device installs a local destination address entry that includes the identifying information in an address table, such as a routing table or a forwarding table. In step 406, the first network device receives a data packet from the relocated VM that includes the information identifying the default gateway. The first network device may then forward the packet into a layer 3 network on behalf of the default gateway.

In order to more clearly describe method 400, reference will be made to information handling system 100 of FIG. 1, though the method may also be described in the context of information handling system 200 of FIG. 2. The VM 114, running on server 112A in data center 110, is moved to server 132B in the data center 130. This move or relocation may be directed by a network administrator. While running on the server 112A, the VM 114 may have a default gateway provided by the network device 120A. As part of this move or prior to this move, network device 120A communicates this relationship to the network device 140A. This may be done by the exchange of MAC address and VLAN information through LLDP (step 402). In addition to this identifying information, the network device 140A may receive an addition message, directing it to create a local destination address entry associated with the identifying information (step 404).

When the relocated VM 114, running on the second server rack 136 sends a packet toward its default gateway, the packet arrives at the network device 140A or 140B, which then recognizes the destination MAC address of the packet (step 406). In accord with the local destination address entry, the network device 140A or 140B forwards or routes the packet into the cloud 150 to its destination (step 408).

Figure 5:
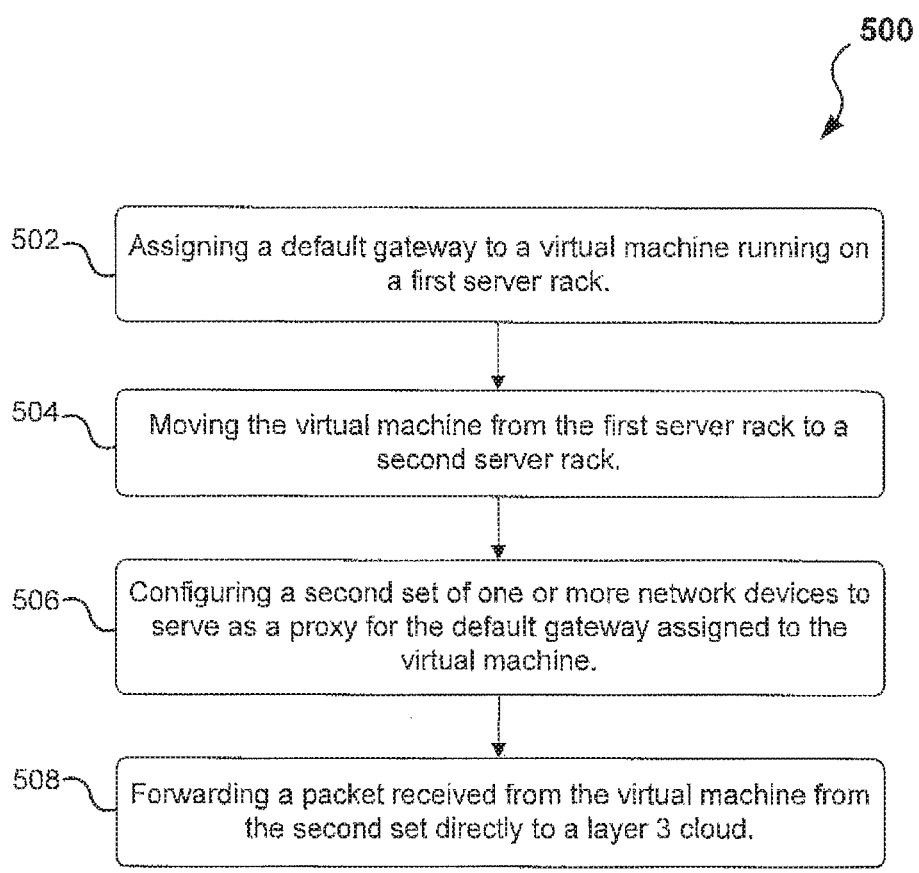
FIG. 5 is a flowchart of an additional method of decreasing inefficient traffic flows in an information handling system.

FIG. 5 is a flowchart of a method 500 for decreasing inefficient traffic flows in the information handling system. As illustrated, the method 500 includes a plurality of enumerated steps. Embodiments of the method 500 may include additional steps before, after, and/or in between the enumerated steps. Additionally, the enumerate steps may be performed in a sequence other than that depicted in FIG. 5. The method 500 may begin when an information handling system controller or a device within the information handling system assigns a default gateway to a virtual machine running on a first server rack, in step 502. The default gateway may be provided by a first set of one or more network devices located directly vertically above the first server rack in a topology of the information handling system. In step 504, the virtual machine is moved from the first server rack to a second server rack. In step 506, a second set of one or more network devices is configured to serve as a proxy for the default gateway assigned to the virtual machine. In step 508, the second set forwards a packet received from the virtual machine directly to a layer 3 cloud on behalf of the default gateway.

In order to provide an additional example of method 500, reference will be made to information handling system 100 and/or information handling system 200. When the VM 114 is instantiated on the server 112A on the server rack 116, it may be configured automatically or by a network administrator with a default gateway in the aggregation layer, which includes a set of network devices 120A and 120B (step 502). While one of the devices 120A and 120B may be the assigned default gateway, these devices are configured in a single domain such that either device may perform the functions of the default gateway for VM 114. The VM 114 may be moved from the server rack 116 in data center 110 to the server rack 136 of data center 130 (step 404).

As part of the move or prior to the move, one of the network devices 120A and 120B may communicate the MAC address and VLAN information associated with the default gateway provided to VM 114. This information may be communicated through LLDP data units, which may also communicate a direction or instruction from the network devices 120A and 120B to the network devices 140A and/or 140B to add a local destination address entry in an address table so that packets received with that information are forwarded into the cloud 150, rather than sent on to the network device 120A or 120B that is actually addressed by the information (step 504). When a packet is received at either the network device 140A or 140B, the destination address of the packet is used to perform a look-up in the address table of the network device, which directs that the forwarding of the packet into the cloud 150 in proxy for the default gateway.

In the event that the VM 114 returns to the server rack 116 in the data center 110, the network devices 120A and/or 120B may send a withdrawal message directing the deletion of the local destination address entry from the network devices 140A and 140B.

Some embodiments of information handling system 100 and 200 include tangible, non-transient, machine-readable media that include executable code that when run by a processor, such the one or more processors 302 of the network devices in FIGS. 1, 2 and 3, may cause the processor(s) to perform the steps of methods 400 and/or 500 as described above. Some common forms of machine-readable media that may include the steps of methods 400 and 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. The machine-readable media may be memory 310 of FIG. 3.

Embodiments of this disclosure may provide more efficient use of network resources, particularly in VLT center out-bound traffic. This may be done by preventing traffic tromboning to decrease usage of inter-center links at the aggregation layer.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A first information handling system comprising one or more processors and memory that are configured to:
   operate as a first gateway that forwards packets from a first server to a first network;
   while operating as the first gateway, perform operations of:
   (a) receiving a first message from a second information handling system operating as a second gateway that forwards packets from a second server to the first network, the first message comprising a local address information of the second gateway, the local address information being for use in packets addressed to the first network and sent by a virtual machine (VM) configured to use the second gateway as a default gateway, the first message instructing the first gateway to serve as a proxy for the second gateway;
   (b) in response to the first message, installing the local address information in a network database in a memory of the first gateway;
   (c) while the local address information is installed in the network database of the first gateway:
   (c1) receiving first packets from a relocated instance of the VM, the relocated instance running on the first server;
   (c2) for each first packet:
   (c2-i) determining whether the first packet comprises destination information which meets the following criteria:
      (1) the destination information comprises local destination information that matches the second gateway's local address information installed in the network database of the first gateway; and
      (2) the destination information comprises a destination address for forwarding the first packet to the first network;
   (c2-ii) upon determining that the destination information meets (1) and (2):
      performing a look-up in the first gateway's network database using the destination address;
      if the look-up is successful, then performing proxy processing, which comprises forwarding the first packet to the first network by the first gateway serving as a proxy for the second gateway;
      if the look-up fails, then sending the first packet by the first gateway to the second gateway instead of performing proxy processing.

2. The first information handling system of claim 1, wherein:
   the local address information comprises a layer 2 address of the second gateway; and
   the destination address comprises a layer 3 address.

3. The first information handling system of claim 1, wherein the first information handling system is part of a first data center and the second information handling system is part of a second data center.

4. The first information handling system of claim 3, wherein the first server is part of the first data center and the second server is part of the second data center.

5. The first information handling system of claim 1, wherein the one or more processors and memory are configured to, while operating as the first gateway:
   receive a second message instructing the first gateway to withdraw from serving as a proxy for the second gateway;
   in response to the second message, deinstall the local address information from the network database.

6. The first information handling system of claim 5, wherein the first message is to be provided to the first information handling system in connection with relocation of the VM, and the second message is to be provided to the first information handling system in connection with another relocation of the VM.

7. The first information handling system of claim 1, wherein the one or more processors and the memory are configured to perform the following operations when the information handling system operates as the first gateway and the local address information is installed in the network database:
   receive non-routable packets from the relocated instance of the VM;

for each non-routable packet that requires a processing operation to be performed:
determine whether the non-routable packet comprises local destination information matching the second gateway's local address information installed in the network database of the first gateway; and
upon determining that the non-routable packet comprises the local destination information matching the second gateway's local address information, send the non-routable packet by the first gateway to the second gateway instead of performing the processing operation at the first gateway.

8. The first information handling system of claim 1, wherein the one or more processors and the memory are configured to perform the following operations when the information handling system operates as the first gateway and the local address information is installed in the network database:
receive ARP packets from the relocated instance of the VM;
for each ARP packet:
determine whether the ARP packet comprises local destination information matching the second gateway's local address information installed in the network database of the first gateway; and
upon determining that the ARP packet comprises local destination information matching the second gateway's local address information, send the ARP packet by the first gateway to the second gateway for ARP processing instead of performing the ARP processing at the first gateway.

9. A method comprising performing, by a first gateway, operations of:
operating as a gateway between a first server and a first network, said operating comprising receiving packets from the first server and forwarding the packets to the first network;
while operating as the gateway between the first server and the first network, performing operations of:
(a) receiving a first message from a second gateway that forwards packets from a second server to the first network, the first message comprising a local address information of the second gateway, the local address information being for use in packets addressed to the first network and sent by a virtual machine (VM) configured to use the second gateway as a default gateway, the first message instructing the first gateway to serve as a proxy for the second gateway;
(b) in response to the first message, installing the local address information in a network database in a memory of the first gateway;
(c) while the local address information is installed in the network database of the first gateway:
(c1) receiving first packets from a relocated instance of the VM, the relocated instance running on the first server;
(c2) for each first packet:
(c2-i) determining whether the first packet comprises destination information which meets the following criteria:
(1) the destination information comprises local destination information that matches the second gateway's local address information installed in the network database of the first gateway; and
(2) the destination information comprises a destination address for forwarding the first packet to the first network;

(c2-ii) upon determining that the destination information meets (1) and (2):
performing a look-up in the first gateway's network database using the destination address;
if the look-up is successful, then performing proxy processing, which comprises forwarding the first packet to the first network by the first gateway serving as a proxy for the second gateway;
if the look-up fails, then sending the first packet by the first gateway to the second gateway instead of performing proxy processing.

10. The method of claim 9, wherein the local address information comprises a layer 2 address of the second gateway; and
the destination address comprises a layer 3 address.

11. The method of claim 9, wherein the first information handling system is part of a first data center and the second information handling system is part of a second data center.

12. The method of claim 11, wherein the first server is part of the first data center and the second server is part of the second data center.

13. The method of claim 12, further comprising, while the local address information is installed in the network database:
receiving, by the first information handling system, a second message instructing the first gateway to withdraw from serving as a proxy for the second gateway; and
in response to the second message, deinstall the local address information from the network database.

14. The method of claim 13, wherein the first message is provided to the first information handling system in connection with relocation of the VM, and the second message is provided to the first information handling system in connection with another relocation of the VM.

15. The method of claim 9, further comprising, when the local address information is installed in the network database:
receiving non-routable packets from the relocated instance of the VM;
for each non-routable packet that requires a processing operation to be performed:
determining whether the non-routable packet comprises local destination information matching the second gateway's local address information installed in the network database of the first gateway; and
upon determining that the non-routable packet comprises the local destination information matching the second gateway's local address information, sending the non-routable packet by the first gateway to the second gateway instead of performing the processing operation at the first gateway.

16. The method of claim 9, further comprising, when the local address information is installed in the network database:
receiving ARP packets from the relocated instance of the VM;
for each ARP packet:
determining whether the ARP packet comprises local destination information matching the second gateway's local address information installed in the network database of the first gateway; and
upon determining that the ARP packet comprises local destination information matching the second gateway's local address information, sending the ARP packet by the first gateway to the second gateway for ARP processing instead of performing the ARP processing at the first gateway.

* * * * *